Nov. 3, 1931.    J. C. CHESTER    1,829,890
DIRECTION SIGNAL FOR MOTOR VEHICLES
Filed March 24, 1931
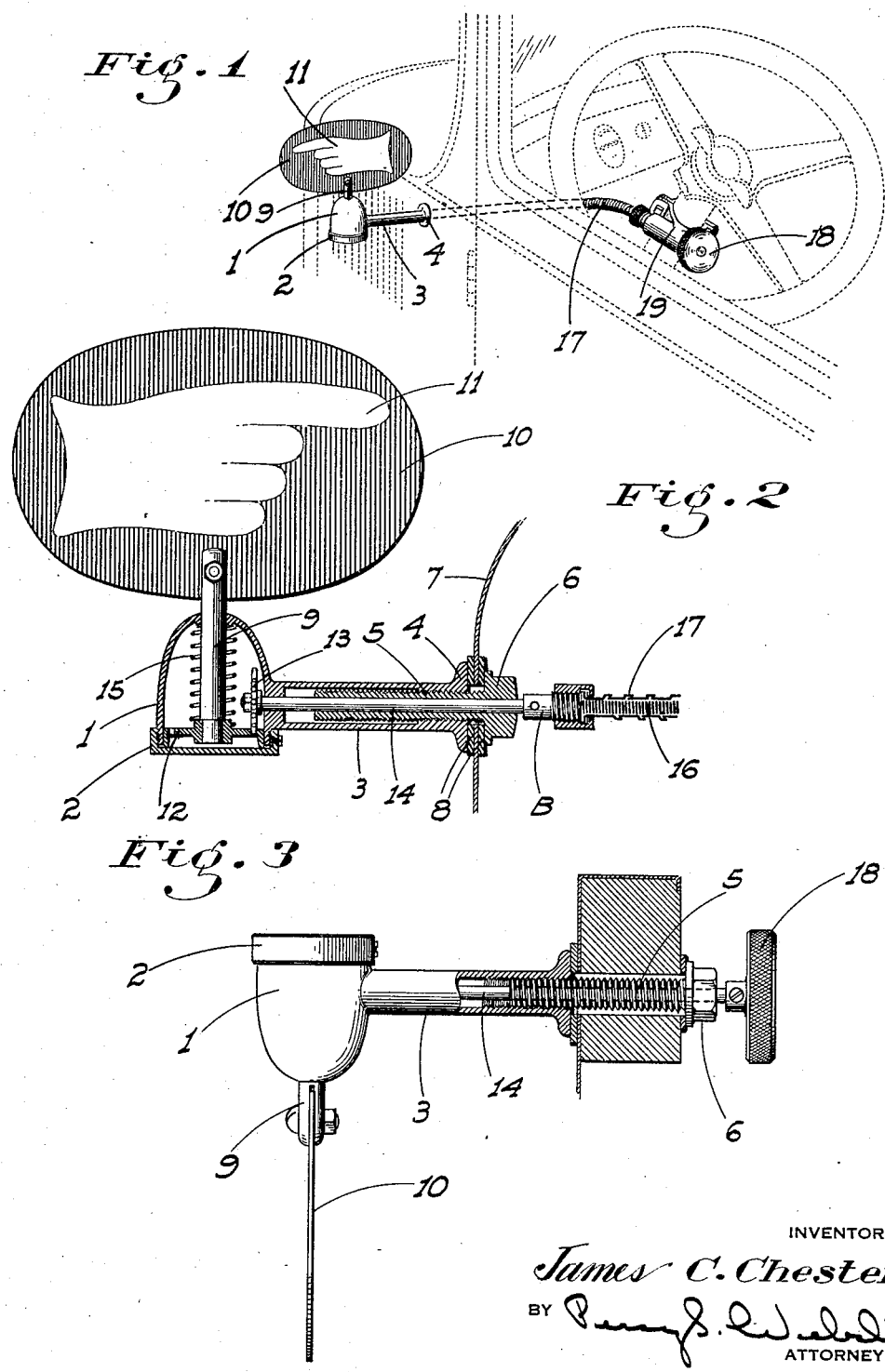
INVENTOR
James C. Chester
BY
ATTORNEY Patented Nov. 3, 1931

1,829,890

UNITED STATES PATENT OFFICE

JAMES C. CHESTER, OF RIVERBANK, CALIFORNIA

DIRECTION SIGNAL FOR MOTOR VEHICLES

Application filed March 24, 1931. Serial No. 524,837.

This invention relates to mechanical hand actuated signals for motor vehicles. The principal object of my invention is to provide a signal of this general character so arranged that it may be mounted without any change in practically any location on any type of motor vehicles; and by means of which right and left hand signals, which can be readily seen, both from in front and from the rear of the vehicle, may be easily and quickly given by driver of the car whenever necessary.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views.

Fig. 1 is a fragmentary perspective outline of a motor vehicle of the closed passenger type, showing my signal mounted thereon and in position to indicate a left turn.

Fig. 2 is a sectional elevation of the signal device as mounted in connection with the vehicle in the position indicated in Fig. 1, but showing the signal itself moving to denote a right hand turn.

Fig. 3 is a side view of the signal shown in an inverted and neutral position and mounted in connection with a relatively thick rib or frame piece of the vehicle.

Referring now more particularly to the characters of reference on the drawings, the signal structure comprises a cylindrical body 1, open only on one end and fitted with a removable cap 2 on the other end. A rigid tubular shank 3 projects radially from the side of the body near its open end, which shank at its outer end has an enlarged flange 4. At said end a tubular threaded extension 5 is adjustably screwed into the shank and has a nut 6 fixed on its outer end. This extension is of sufficient length so that it may project through a relatively thick rib, etc. and still have a portion properly engaging the shank. In mounting this structure (which forms the immovable part of the signal apparatus) in place, the flange engages the outer surface of the body of the vehicle.

The extension projects through the metal sheathing 7, as in Fig. 2, or through the sheathing and a rib or frame beam, as in Fig. 3; the nut bearing against the inner surface of the body and clamping the flange against the outer surface. It is, of course, to be understood that washers 8 of suitable character are preferably placed between the body and the flange and nut, so as to prevent marring the surface.

Turnably mounted in the closed end of the body 1, centrally thereof and projecting outwardly is a shaft 9. This shaft outwardly of the body is split lengthwise to straddle a signal plate 10. This plate is of suitable shape and material and is symmetrical relative to the point of connection of the shaft therewith. It is preferably provided on both sides with the representation of a hand as at 11, both hands pointing in the same direction. It is here to be understood that other shapes and types of signal member than that shown can be used if desired.

Fixed on the shaft inside the body is a gear 12, engaged by a pinion 13. This pinion is fixed on the adjacent end of a shaft 14 which extends through and is turnably mounted in the shank 3 and the extension 5. For cheapness of construction, the pinion and gear are preferably of the pin and hole type, which function satisfactorily with little or no lubrication. The gear, which is in the form of a disc, has a running fit with the body, so that the shaft 9 needs no bearing in the cap. By adjusting the cap, the gear may be shifted lengthwise in the body so as to keep it in proper relationship to the pinion at all times. To prevent possible rattling of the shaft 9, and vertical shifting of the same if the signal body is inverted as shown in Fig. 3, a compression spring 15 is disposed about the shaft between the gear and the closed end of the body.

In the installation shown for a modern closed car, the extension 5 would project into the vehicle in front of the dash board.

The shaft 14 therefore is connected at its free end by a removable bushing B to a flexible cable 16 which is enclosed in a housing 17 as usual. The cable bends to extend rearwardly of the vehicle to a convenient point, and on its rear end as provided with an operating handle or knob 18. In the arrangement shown, the handle is supported from a bracket 19 which is mounted on the steering column of the vehicle in a position so that it is convenient to the hand of the driver.

In operation therefore, it will be seen that by suitable turning of the knob the signal plate 10 may be turned so that it will be disposed lengthwise of the vehicle (or in a neutral position) or so that the hands 11 directly point to one side or the other. Shaft 14 and associated parts are not limited in rotation to either direction, and different signals can be given by rotating the knob in the same direction, or by reversing the direction of rotation as may be desired. This feature makes the giving of a signal very easy to accomplish, and makes it immaterial whether the shank 3 is disposed in a direct transverse plane or not, since the signal plate can always be set by the driver in such plane, regardless of the setting of the shank. The arrangement and construction of the device as a whole, enables the signal plate to be disposed above the body as in Figs. 1 and 2, or below the same as shown in Fig. 3, depending on the character of vehicle and the conditions under which it is mounted.

In the arrangement shown in Fig. 3, the flexible cable is removed, and the operating knob 18 is directly connected to the outer end of the shaft 14. This provides an arrangement which can only be used where the signal can be mounted in position so that the knob thus disposed is convenient to the hand of the driver.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A direction signal for motor vehicles comprising a body, a tubular shank rigid with and projecting from one side of the body, an enlarged flange on the outer end of the shank adapted to abut against the outer surface of a vehicle body, a tubular extension projecting from the outer end of the shank and longitudinally alined therewith, said extension being adapted to project through the vehicle body, a nut on the extension to engage the inner surface of the vehicle body, a movable signal device mounted in conjunction with the body, and means to operate the device including a shaft turnably mounted in and projecting through the shank and extension.

2. A structure as in claim 1, in which the extension is adjustably screwed into the shank and the nut is fixed thereon.

3. A direction signal for motor vehicles comprising a body, a movable signal device supported therefrom, a tubular shank projecting from one side of the body and adapted at its opposite end to abut against the exterior of the vehicle body, an extension in said end of the shank and projecting through the vehicle body, means to operate the signal including a shaft turnably mounted in and projecting through the extension and means between the extension and shank to clamp the latter in place against the vehicle body.

In testimony whereof I affix my signature.

JAMES C. CHESTER.